US012739644B2

(12) United States Patent
Ham et al.

(10) Patent No.: US 12,739,644 B2
(45) Date of Patent: Sep. 15, 2026

(54) SENSING DEVICE, WIRELESS INTRUSION PREVENTION SYSTEM COMPRISING SENSING DEVICE, AND METHOD FOR OPERATING SAME

(71) Applicant: SECUI CORPORATION, Seoul (KR)

(72) Inventors: Seong Yun Ham, Gyeonggi-do (KR); Min Ki Son, Seoul (KR)

(73) Assignee: SECUI CORPORATION, Seoul (KR)

(*) Notice: Subject to any disclaimer, the term of this patent is extended or adjusted under 35 U.S.C. 154(b) by 89 days.

(21) Appl. No.: 18/682,961

(22) PCT Filed: Apr. 13, 2022

(86) PCT No.: PCT/KR2022/005381
§ 371 (c)(1),
(2) Date: Feb. 12, 2024

(87) PCT Pub. No.: WO2023/017952
PCT Pub. Date: Feb. 16, 2023

(65) Prior Publication Data

US 2025/0142338 A1 May 1, 2025

(30) Foreign Application Priority Data

Aug. 10, 2021 (KR) ........................ 10-2021-0105476

(51) Int. Cl.
*H04W 12/122* (2021.01)
*H04W 12/06* (2021.01)

(52) U.S. Cl.
CPC ......... *H04W 12/122* (2021.01); *H04W 12/06* (2013.01)

(58) Field of Classification Search
CPC ... H04W 12/122; H04W 12/06; H04W 12/12; H04L 63/1441; H04L 63/1416; H04L 63/1425; G06F 21/556
See application file for complete search history.

(56) References Cited

U.S. PATENT DOCUMENTS 7,058,796 B2 * 6/2006 Lynn ................... H04L 63/1441 713/168
8,069,483 B1 * 11/2011 Matlock .............. H04W 12/122 726/13

(Continued)

FOREIGN PATENT DOCUMENTS

JP 2014155095 A 8/2014
JP 7079994 B1 6/2022

(Continued)

OTHER PUBLICATIONS

C. Louca, A. Peratikou and S. Stavrou, “On the detection of Channel Switch Announcement Attack in 802.11 networks,” 2021 IEEE International Conference on Cyber Security and Resilience (CSR), Rhodes, Greece, 2021, pp. 281-285. (Year: 2021).*

(Continued)

*Primary Examiner* — Kari L Schmidt
(74) *Attorney, Agent, or Firm* — IP&T GROUP LLP

(57) ABSTRACT

The technology of the present disclosure relates to an electronic device, and a sensing device for monitoring connection between an access point and a station according to the technology includes a template storage configured to store a block template used to create a wireless communication message to block connection between the station and the access point, and a sensing controller configured to obtain a message transmitted or received by the station and the access point, and when the station is a station included in a list of targets to be blocked provided from a server as a result of analyzing based on the message, transmit, to the station, a block message with an address of the access point, an address of the station and a channel switching request command to request switching of a channel on which the station and the access point communicate inserted to the block template.

9 Claims, 7 Drawing Sheets

(56) References Cited

U.S. PATENT DOCUMENTS 8,887,240 B2 * 11/2014 Lee ........................ H04W 12/12 726/3
9,363,675 B2 * 6/2016 Chuang ............... H04W 12/125
11,218,881 B1 * 1/2022 De ........................ H04W 12/63
2002/0059078 A1 * 5/2002 Valdes ................ H04L 41/0631 705/1.1
2003/0233567 A1 * 12/2003 Lynn ........................ H04K 3/86 726/23
2007/0079376 A1 * 4/2007 Robert ................ H04L 63/1441 726/23
2007/0173199 A1 * 7/2007 Sinha .................. H04W 12/122 455/67.11
2007/0199061 A1 * 8/2007 Byres .................. H04L 41/0806 726/11
2008/0044018 A1 * 2/2008 Scrimsher ............. G06F 21/554 380/210
2009/0168706 A1 * 7/2009 Avonts .................. H04W 36/06 370/329
2010/0232337 A1 * 9/2010 Das ......................... H04W 4/12 370/312
2010/0267402 A1 * 10/2010 Avasarala ............ G06Q 10/107 455/466
2010/0296496 A1 * 11/2010 Sinha .................... H04W 12/12 370/338
2014/0082728 A1 * 3/2014 Kim .................... H04L 63/1416 726/23
2014/0157364 A1 * 6/2014 Lee ..................... H04W 12/122 726/3
2014/0334317 A1 * 11/2014 Atreya ............... H04L 63/1416 370/252
2015/0172289 A1 * 6/2015 Kwon ................. H04W 12/122 726/3
2015/0358345 A1 * 12/2015 Clark .................... G06F 21/556 726/25
2016/0330229 A1 * 11/2016 Watson ............... H04L 63/1441
2017/0223039 A1 * 8/2017 Mont ...................... H04L 41/40
2018/0324200 A1 * 11/2018 Choi ..................... H04W 48/08
2019/0306034 A1 * 10/2019 Shanbhag ........... H04W 12/122
2020/0137579 A1 * 4/2020 Choi ..................... H04W 72/20
2023/0034609 A1 * 2/2023 Huang ................ H04W 12/122
2023/0099706 A1 * 3/2023 Ham ..................... H04W 48/02 726/6

FOREIGN PATENT DOCUMENTS

KR 20080108806 A 12/2008
KR 101447469 B1 10/2014
KR 20150080779 A 7/2015
KR 20170062301 A 6/2017
KR 20190034193 A 4/2019
KR 102102835 B1 4/2020
KR 102157661 B1 9/2020
KR 102359805 B1 2/2022

OTHER PUBLICATIONS

R. Jang, J. Kang, A. Mohaisen and D. Nyang, "Catch Me If You Can: Rogue Access Point Detection Using Intentional Channel Interference," in IEEE Transactions on Mobile Computing, vol. 19, No. 5, pp. 1056-1071, May 1, 2020. (Year: 2020).*

S.-H. Choi, D.-H. Hwang and Y.-H. Choi, "Wireless intrusion prevention system using dynamic random forest against wireless MAC spoofing attack," 2017 IEEE Conference on Dependable and Secure Computing, Taipei, Taiwan, 2017, pp. 131-137. (Year: 2017).*

Office Action for Japanese Patent Application No. 2024-508612 issued by the Japanese Patent Office on Mar. 18, 2025.

* cited by examiner

SENSING DEVICE, WIRELESS INTRUSION PREVENTION SYSTEM COMPRISING SENSING DEVICE, AND METHOD FOR OPERATING SAME

This application is a national phase entry under 35 USC 371 of International Patent Application No. PCT/KR2022/005381, filed on Apr. 13, 2022, which claims priority to Korean Patent Application No. 10-2021-0105476, filed on Aug. 10, 2021. The disclosure of each of the foregoing applications is incorporated herein by reference in its entirety.

TECHNICAL FIELD

The present disclosure relates to an electronic device, and more particularly, to a sensing device, a wireless intrusion prevention system including the sensing device and an operating method thereof.

BACKGROUND ART

A huge network environment is being created with the rapid development and availability of the Internet, and its form is getting complicated due to simple and convenient network connectivity and provision of various services of the Internet. However, due to various types of network attacks such as viruses, hacking, system intrusion, acquisition of system administration authority, concealment of intrusion, denial of service attack, etc., on the Internet, the Internet is always exposed to the risk of being hacked and has increasing infringement thereon, and the extent of damage to public institutes, infrastructures and financial companies is ever increasing and has a big influence. In order to solve these Internet security problems, there is a need for network security technologies such as virus vaccines, firewalls, integrated security management, intrusion detection systems, etc.

A wireless network system for wireless Internet communication includes a wireless LAN access point (AP) and a wireless LAN station.

An integrated network system using cable and radio are being widely developed and applied these days. Stably blocking harmful traffic that has access on cable is difficult, but stably blocking harmful traffic that has access wirelessly is more difficult. To solve this, a wireless intrusion prevention system (WIPS) is being developed. The WIPS is a system for detecting and blocking wireless intrusion such as a rouge AP/station, unauthorized AP/station or denial of service (DOS) attacks through wireless section monitoring.

DISCLOSURE

Technical Problem

An embodiment of the present disclosure provides a sensing device for blocking access of a station, a wireless intrusion prevention system including the sensing device and an operation method thereof.

Technical Solution

According to an embodiment of the present disclosure, a sensing device for monitoring connection between an access point and a station according to the technology includes a template storage configured to store a block template used to create a wireless communication message to block connection between the station and the access point, and a sensing controller configured to obtain a message transmitted or received by the station and the access point, and when the station is a station included in a list of targets to be blocked provided from a server as a result of analyzing based on the message, transmit, to the station, a block message with an address of the access point, an address of the station and a channel switching request command to request switching of a channel on which the station and the access point communicate inserted to the block template.

According to an embodiment of the present disclosure, an operating method of a sensing device for monitoring connection between an access point and a station includes storing a block template used to create a wireless communication message to block connection between the station and the access point, obtaining a message transmitted by the station to the access point, and determining based on the message whether the station is a station included in a list of targets to be blocked provided from a server, and transmitting, to the station, a block message with an address of the access point and a channel switching request command to request switching of a channel on which the station and the access point communicate inserted to the block template.

According to an embodiment of the present disclosure, a sensing device for monitoring connection between an access point and a plurality of stations includes a template storage configured to store a block template used to create a wireless communication message to block connection between the plurality of stations and the access point, and a sensing controller configured to obtain a message transmitted or received by the plurality of stations and the access point, and when the access point is an access point included in a list of targets to be blocked provided from a server as a result of analyzing the message, transmit, to the plurality of stations, block messages with an address of the access point, an address of each of the plurality of stations and a channel switching request command to request switching a channel on which the station and the access point communicate inserted to the block template.

Advantageous Effects

A sensing device, wireless intrusion prevention system including the sensing device, and operating method thereof provided according to the technology of the present disclosure may, firstly, reduce a block message creation time by reducing unnecessary analytical time because there is no need to analyze whether the network uses IEEE 802.11w for creation of a block message, manage an associated session list separately, or use an extra blocking method based on the session list.

Secondly, the present disclosure may reduce time for reproducing an unnecessary AP message by applying a block template that predefines only minimum information for creating a block message in a block message creation procedure, reducing the size of the created block message as compared to the reproduced AP message, reducing time for determining a frequency band as well because the inserted channel switching request also uses the same information regardless of the frequency band, and as a result, enhancing blocking performance.

Thirdly, the present disclosure may block only a station that will transmit a block message without affecting normal stations connected to an AP because the block message is to be transmitted only to a station to be blocked. Furthermore, an effect of being able to block all stations intended to access the AP may be gained by transmitting the block messages to all the stations individually when multiple stations are to be blocked.

Fourthly, with the implementation of a technology based on a wireless standard, the present disclosure may have the same effect even in the new 6 GHz band through the block message in addition to the frequency bands (2.4 GHZ, 5 GHZ) that have thus far been used.

MODE FOR INVENTION

Figure 1:
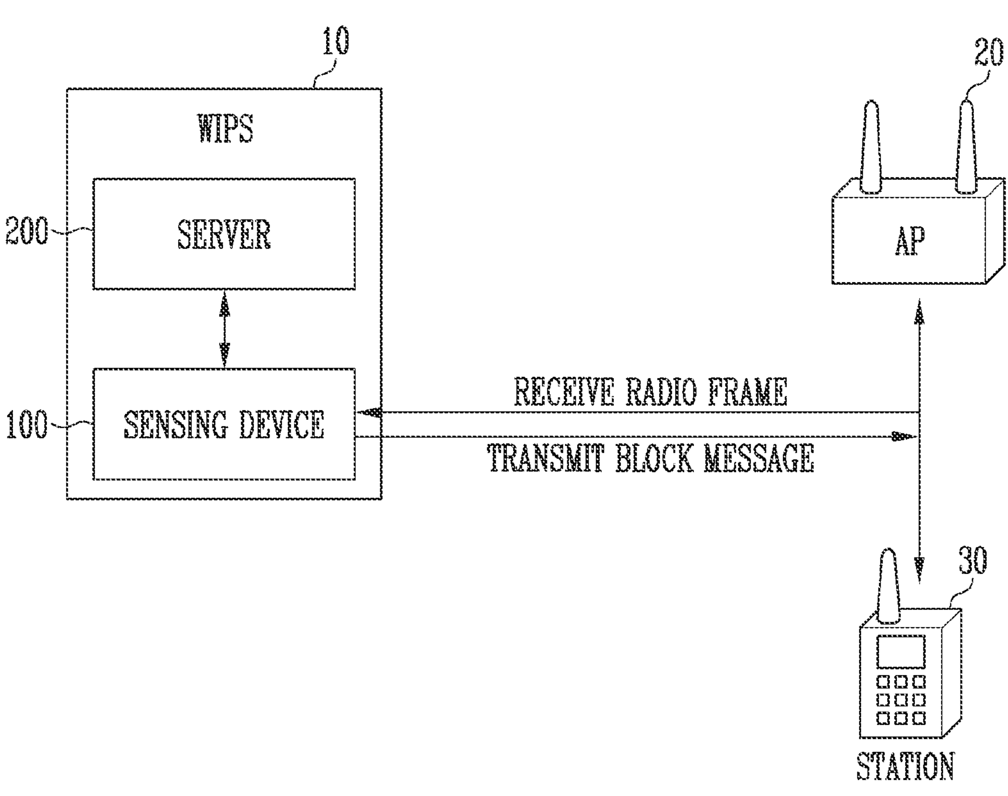
FIG. 1 is a diagram for explaining general operation of a WIPS to block connection between an AP and a station.

Throughout the specification, certain structural or functional descriptions are merely provided for the purpose of explaining embodiments of the present disclosure, which may be put in practice in various forms, and should not be construed as being limited to the embodiments of the present disclosure.

A wireless intrusion prevention system (hereinafter, WIPS) as will be described below is a system for detecting and blocking wireless intrusion such as rouge access point (AP)/station, unauthorized AP/station or denial of service attack, etc., through wireless section monitoring.

A common wireless network as will be mentioned throughout the specification may refer to a wireless network that uses an IEEE 802.11 technology, and a wireless network that uses a certain security technology may refer to a wireless network that uses an IEEE 802.11w technology. IEEE 802.11w is a revised version of the IEEE 802.11 technology, which enhances security of a management frame. It is not, however, limited thereto, and it is obvious that embodiments of the present disclosure may be commonly applied to normal wireless networks that use various security technologies and the wireless network that uses the certain security technology.

An access point (hereinafter, AP) is an entity for providing access to a distribution system via a wireless medium for stations associated to the AP. The AP is used as a concept including a personal BSS coordination point (PCP), and may broadly include all the concepts such as a centralized controller, a base station (BS), a node B, a base transceiver system (BTS), a site controller, or the like. In the present disclosure, the AP may also be referred to as a base wireless communication station, and the base wireless communication station may be used as a term including all the AP, base station, eNodeB (eNB) and a transmission point (TP) in a broad sense. In addition, the base wireless communication station may include various types of wireless communication stations that allocate communication medium resources and perform scheduling in communication with a plurality of wireless communication stations.

The station is any device including a medium access control (MAC) and physical layer for wireless medium interface conforming to rules of the IEEE 802.11 standard, and may include all access points (APs) as well as non-access points (APs) in a broad sense. Throughout the specification, the station refers to a non-AP station but may also be used as a term referring to both the non-AP station and the AP. The station for wireless communication may include a processor and a transmit/receive unit, and further include a user interface and a display unit according to an embodiment. The processor may create a message for transmission over a wireless network or process a message received over the wireless network, and moreover, perform various processes to control the station. Furthermore, the transmit/receive unit is functionally connected to the processor, and transmits or receives a message for the station over the wireless network. The station may transmit or receive a message to or from the AP over the wireless network.

According to an embodiment of the present disclosure, a sensing device, wireless intrusion prevention system including the sensing device and operating method thereof may provide a technology to block connection between the AP and the station without distinguishing what frequency band (2.4 GHZ/5 GHZ/6 GHZ) is used in a connection procedure between the AP and the station, whether the wireless network uses IEEE 802.11w (protected management frame (PMF)), what authentication scheme and what encryption scheme are used, and whether it is before or after network connection.

FIG. 1 is a diagram for explaining general operation of a WIPS to block connection between an AP and a station.

Referring to FIG. 1, a WIPS 10 may include a sensing device 100 and a server 200.

The sensing device 100 may monitor connection between an AP 20 and a station 30. In an embodiment, the sensing device 100 may receive a radio frame. For example, the sensing device 100 may obtain messages transmitted or received for connection by the station 30 and the AP 20. The sensing device 100 may determine whether the station or the AP is the station 30 or the AP 20 included in a list of targets to be blocked provided from the server 200 based on the message obtained from the station 30 and the AP 20. Afterward, the sensing device 100 may transmit a block message over the wireless network to block connection between the station 30 and the AP 20.

Figure 2:
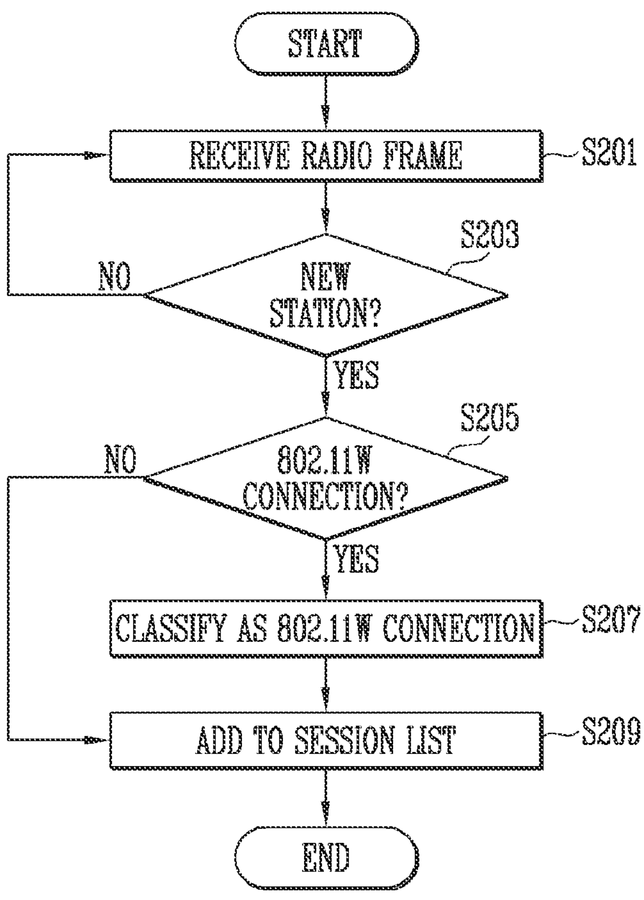
FIG. 2 is a flowchart for explaining a session determination and classification procedure of a conventional sensing device in a general wireless network and a wireless network that employs a certain security technology.

FIG. 2 is a flowchart for explaining a session determination and classification procedure of a conventional sensing device in a general wireless network and a wireless network that employs a certain security technology.

Referring to FIG. 2, at step S201, a conventional sensing device may receive a radio frame. For example, the conventional sensing device may obtain messages transmitted or received by a station and an AP.

At step S203, the conventional sensing device may obtain messages transmitted or received by the station and the AP and determine whether it is a new station. When the conventional sensing device has a result of analyzing the message transmitted or received by the station and the AP, which indicates a new station, step S205 may be performed. Otherwise, when the result of analyzing the message transmitted or received by the station and the AP does not indicate a new station, step S201 may be performed again.

At step S205, the conventional sensing device may analyze a message transmitted or received by the new station and the AP and determine whether the connection uses the 802.11w technology.

At step S207, when the message transmitted or received by the new station and the AP corresponds to connection that uses the 802.11w technology, the conventional sensing device may classify it as a wireless network that uses a certain security technology and add it to a session list at step S209. Otherwise, when the analyzing of the message transmitted or received by the new station and the AP does not indicate the connection that uses the 802.11w technology, it is classified as normal wireless network connection and at step S209, separately added to the session list.

At step S209, the conventional sensing device may distinguish session information from analyzing the message transmitted or received by the station and the AP based on whether it is the 802.11w connection, and may add it to the session list.

As described above through FIG. 2, the conventional sensing device proceeds to a procedure for classifying the session list separately based on whether the message transmitted or received by the station and the AP corresponds to the IEEE 802.11w connection.

Figure 3:
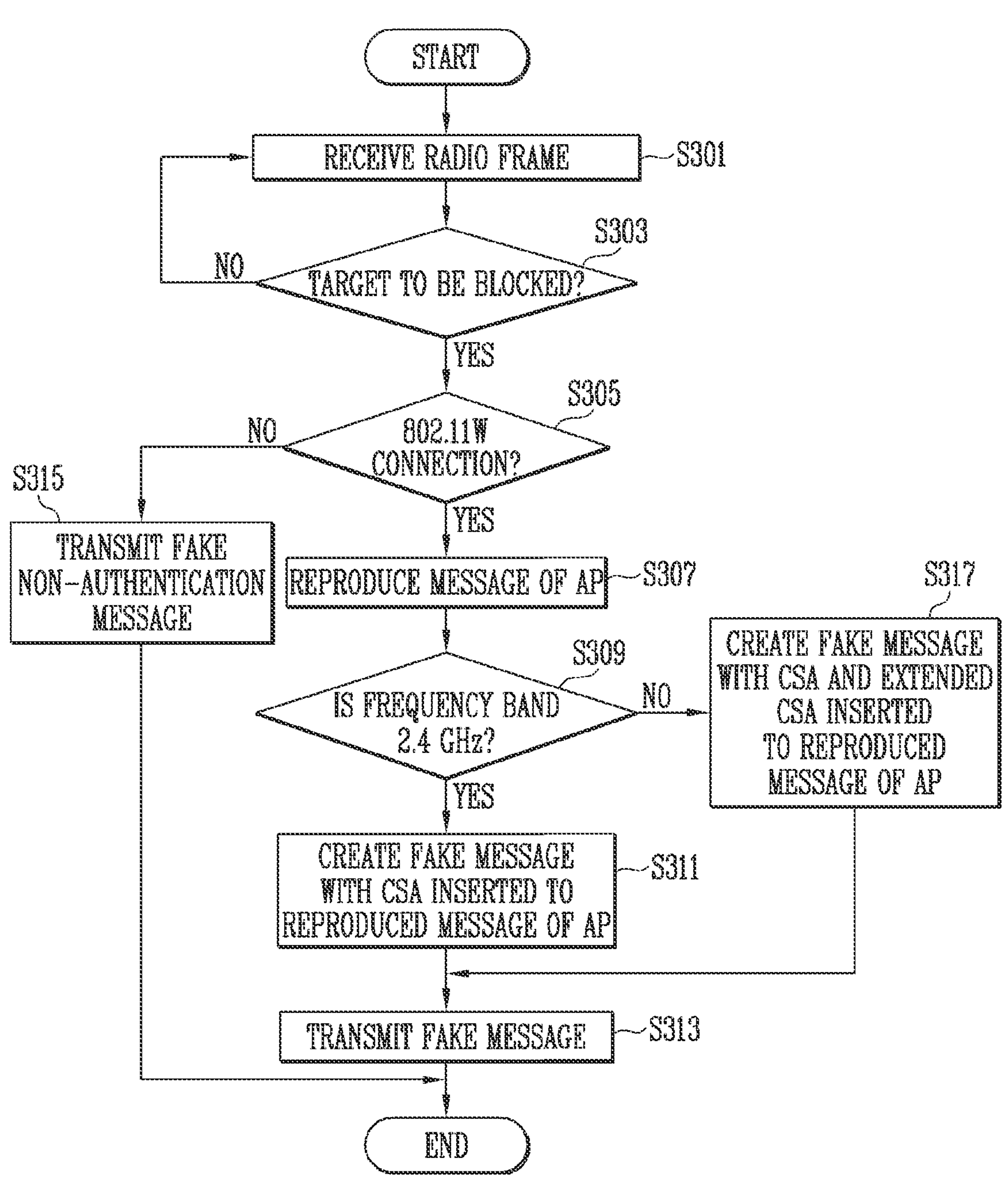
FIG. 3 is a flowchart for explaining a blocking procedure of a conventional sensing device in a general wireless network and a wireless network that employs a certain security technology.

FIG. 3 is a flowchart for explaining a blocking procedure of a conventional sensing device in a general wireless network and a wireless network that uses a certain security technology.

Referring to FIG. 3, at steps S301 and S303, the conventional sensing device may analyze messages transmitted or received by a station and an AP and determine whether the station or the AP is to be blocked. When the conventional sensing device has a result of analyzing the message transmitted or received by the station and the AP, which indicates that the station or the AP is to be blocked, step S305 may be proceeded. Otherwise, when the station or the AP is not to be blocked, step S301 may be performed again.

At step S305, the conventional sensing device may analyze the message transmitted or received by the station and the AP and determine whether it is the 802.11w connection. When the message transmitted or received by the station and the AP corresponds to the 802.11w connection, it is determined as a wireless network that uses a certain security technology and the step S307 may be proceeded. Otherwise, when the message transmitted or received by the station and the AP does not correspond to the 802.11w connection, it is determined as a normal wireless network and step S315 may be proceeded.

At step S307, when the message transmitted or received by the station and the AP corresponds to the 802.11w connection, the conventional sensing device may reproduce the wireless communication message transmitted by the AP.

At step S315, when the message transmitted or received by the station and the AP does not correspond to the 802.11w connection, the conventional sensing device may transmit a fake non-authentication message.

At step S309, the conventional sensing device may determine whether the frequency band of the message transmitted or received by the station and the AP is 2.4 GHZ. When the frequency band of the message transmitted or received by the station and the AP is 2.4 GHz, step S311 may be proceeded. Otherwise, when the frequency band of the message transmitted or received by the station and the AP is not 2.4 GHz but 5 GHZ, step S317 may be proceeded.

At step S311, when the frequency band of the reproduced wireless communication message of the AP is 2.4 GHZ, the conventional sensing device may create a fake message with a channel switching request command (CSA) inserted to the reproduced wireless communication message of the AP.

The channel switching request command may be a command to request switching of a channel for connection or communication between the station and the AP.

At step S317, when the frequency band of the reproduced AP wireless communication message is not 2.4 GHz but 5 GHz, the conventional sensing device may create a fake message with not only the channel switching request command (CSA) but also an extended channel switching request command (extended CSA) additionally inserted to the reproduced wireless communication message of the AP.

At step S313, the conventional sensing device may transmit the created fake message.

As described above through FIG. 3, to block connection between the station and the AP, the conventional sensing device creates the fake message with the channel switching request command (CSA) inserted to the fake non-authentication message or the reproduced wireless communication message of the AP and transmits the message over the wireless network according to whether the message transmitted or received by the station and the AP corresponds to the 802.11w connection. Furthermore, the conventional sensing device inserts a different channel switching request command for each band to the fake message according to whether the frequency band of the reproduced wireless communication message of the AP is 2.4 GHz or 5 GHZ.

In other words, the conventional sensing device requires a procedure for determining whether the message transmitted by the station corresponds to the 802.11w connection, a procedure for determining whether the frequency band of the reproduced wireless communication message of the AP is 2.4 GHZ, and a procedure for creating a different channel switching request command for each frequency band, separately.

Figure 4:
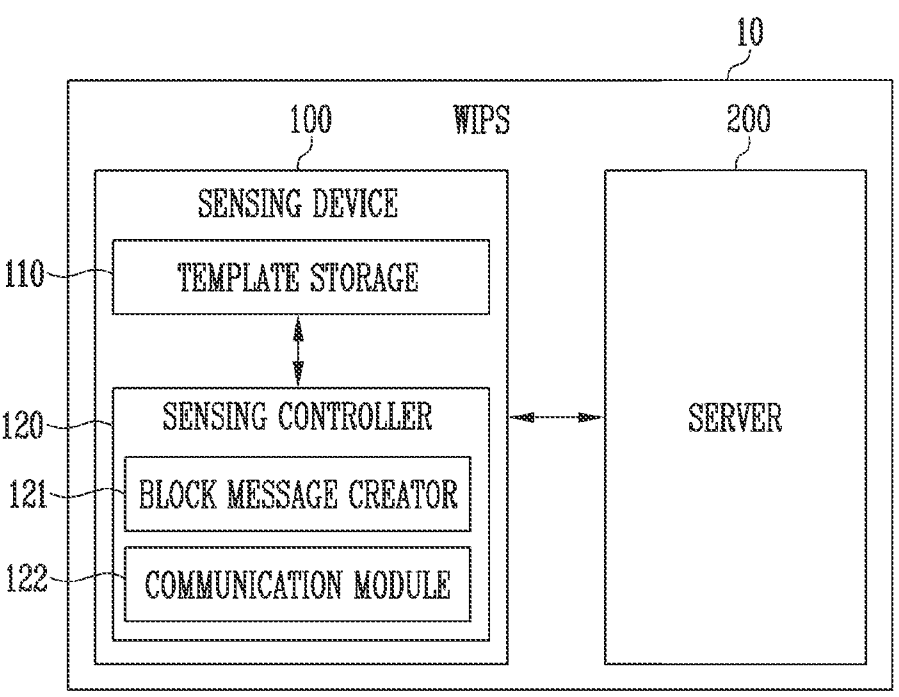
FIG. 4 is a diagram for explaining a WIPS according to an embodiment of the present disclosure.

FIG. 4 is a diagram for explaining a WIPS according to an embodiment of the present disclosure.

Referring to FIG. 4, the WIPS 10 may include the sensing device 100 and the server 200. In the embodiment, the sensing device 100 may monitor messages transmitted or received between a station and an AP, and based on the monitored message, process such information as an MAC address of the station or the the message, AP that transmits a security establishment description, a frame appearance frequency, a transmission rate, an amount of data, SSID, IEEE 802.11a/b/g/n/ac/ax, a channel, an RSSI, etc. The sensing device 100 may then transmit the processed information to the server 200.

The server 200 may determine whether the station or the AP is unauthorized and whether it is abnormally operated by comparing the processed information with databased signature information. In this case, the signature information may include message header information or information about a message occurrence frequency.

The server 200 may determine whether the detected AP is not authorized. The server 200 may determine that the AP is an unauthorized AP when the AP is not classified as an authorized AP in advance based on other information stored in a database (DB) such as a BSSID, an MAC address, etc. An unauthorized station may also be determined in the similar manner.

When the AP is determined to be an unauthorized AP, the server 200 may perform automatic blocking according to a blocking policy or make alarm for an administrator to manually perform blocking. With the determination of blocking, the server 200 may transmit a list of targets to be blocked or blocking policy information to the sensor device 100.

The sensor device 100 may select an AP and a station to be blocked according to the determination based on the list of targets to be blocked and the blocking policy, and perform blocking.

In an embodiment, blocking of the sensing device 100 based on the list of targets to be blocked and the blocking policy may include blocking connection between a particular AP and a particular station. The sensing device 100 may block connection when an authorized station is connected to an unauthorized AP or when an unauthorized station is connected to an authorized AP. For example, the sensing device 100 may block connection of an authorized station to an unauthorized AP when a BSSID of the unauthorized AP is detected. In another example, the sensing device 100 may block connection of an unauthorized station to an authorized AP when a MAC of the unauthorized station is detected.

In an embodiment, the sensing device 100 may include a template storage 110 and a sensing controller 120.

The template storage 110 may store a block template used to create a wireless communication message to block connection between a station and an access point.

For example, the blocking template may be a template used to create a wireless communication message for blocking the connection between the station and the AP even when an authentication scheme, an encryption scheme, a frequency band, etc., included in the communication scheme between the station and the AP differ for each station or each AP. The block template may include an authentication scheme and an encryption scheme used for connection between the station and the access point, and the block message may include n about information the sensing device transmitting the block message and information about a cause of blocking. In another example, the blocking template may be a template used to create a wireless communication message to block the connection between the station and the AP no matter whether it is a normal wireless network or a wireless network that uses a certain security technology.

For example, the block template may include a support rate, a DSP, a TIM and a RSN.

The conventional sensing device reproduces a wireless communication message transmitted by the AP to be blocked in the wireless network that uses a certain security technology and inserts a channel switching request command (CSA) or an extended CSA thereto depending on the frequency band to create a fake message, and transmits the fake message over the wireless network. On the contrary, in an embodiment of the present disclosure, as compared to the method of reproducing the wireless communication message, time for creation of a wireless communication message may be reduced and the size of the wireless communication message may also be reduced by storing only items required for creation of the wireless communication message for blocking in the template storage 110 in advance for the station to determine it as a wireless communication message transmitted by the AP.

The sensing controller 120 may monitor connection between the AP and the station, and create a block message (fake beacon) based on a message transmitted or received between the station and the AP and transmit the block message to the station.

In an embodiment, the sensing controller 120 may include a block message creator 121 and a communication module 122.

The block message creator 121 may analyze the message transmitted or received by the station and the AP, which is obtained by the communication module 122. The block message creator 121 may add/update information of the station that will transmit a message. The block message creator 121 may determine whether the station to transmit the message corresponds to the list of targets to be blocked provided by the server 200. The block message creator 121 may create a block message when the message corresponds to the list of targets to be blocked.

The block message creator 121 may create the block message (fake beacon) by receiving a block template from the template storage 110. In an embodiment, the block message creator 121 may create the block message by using the block template when an AP to which the station intends to connect is an unauthorized AP. For example, the block message creator 121 may create the block message by inserting a channel switching request command and other required information with a BSSID of the unauthorized AP for a sending address and MAC of the station that intends to connect to the unauthorized AP for a receiving address to the block template. The channel switching request command may be a command to request switching of a channel for connection or communication between the station and the AP. In an embodiment, the channel switching request command may include a value of a channel to be switched by the station.

In another embodiment, when an AP to which a plurality of stations intend to connect is an unauthorized AP, the block message creator 121 may create block messages by inserting a channel switching request command and other required information with a BSSID of the unauthorized AP for a sending address and MAC of each of the plurality of stations that intend to connect to the unauthorized AP for a receiving address to the block template. Afterward, the block message creator 121 may transmit the created block messages to the plurality of stations, respectively, which intend to connect to the unauthorized AP through the communication module 122.

In an embodiment, the block message creator 121 may block connection between the authorized station and the unauthorized AP by transmitting the created block message to the authorized station through the communication module 122. Specifically, the authorized station may try to connect to the unauthorized AP on a channel to be switched by the channel switching request command inserted to the block message. In an embodiment, the value of the channel to be switched, which is included in the channel switching request command, is a channel value different from a channel value actually used by the unauthorized AP to which the station intends to connect. For example, the channel value to be switched may be a channel value which is created randomly. In other words, as the channel value to be switched, which is inserted to the block message, does not correspond to a channel value used by the message transmitted by the unauthorized AP to which the station intends to connect, the authorized station may be blocked from being connected to the unauthorized AP.

In an embodiment, the same channel switching request command may be created and inserted to the block message regardless of the frequency band in which the station and the AP perform transmission and reception. Specifically, as the channel value to be switched, which is included in the channel switching request command, may be randomly set, the same channel switching request command may be created in the frequency band of 2.4 GHZ, 5 GHZ and 6 GHz. Hence, there is no need for the AP to determine a frequency band of the wireless communication message for transmission, and as time for creating the channel switching request command is reduced, time for blocking connection between the station and the AP may be reduced.

In another embodiment, even in a case that an unauthorized station intends to connect to an authorized AP, the block message creator 121 may block connection between the unauthorized station and the authorized AP by creating the block message based on the block template in the same method as described above and transmitting the block message to the unauthorized station.

In an embodiment, the block message creator 121 may block connection between the station and the AP by transmitting the block message to the station through the communication module 122, and create a blocking event. The block message creator 121 may send the created blocking event to the server 200.

The communication module 122 may obtain messages transmitted or received by the AP and the station. In an embodiment, the communication module 122 may provide a message obtained in a communication procedure of the AP and the station to the block message creator 121.

The communication module 122 may analyze the message obtained in the communication procedure of the AP and the station, and when it corresponds to the list of targets to be blocked provided from the server 200, receive the created block message from the block message creator 121 and transmit the block message to the station.

The present disclosure may block an individual station to be blocked by setting a receiving address of the block message to MAC of the station. Specifically, in both cases that the authorized station intends to connect to the unauthorized AP or that the unauthorized station intends to connect to the authorized AP, the block message may be transmitted only to a station to be blocked, thereby enabling individual blocking. Accordingly, it may not have any influence to connection of a normal station that intends to connect to an unauthorized AP or an authorized AP.

The conventional sensing device distinguishes whether a wireless network environment in which an AP and a station make connection corresponds to a normal wireless network or a wireless network that uses a certain security technology. Furthermore, the conventional sensing device blocks connection between the AP and the station through a fake non-authentication message in a normal wireless network environment, and creates a fake message by reproducing a wireless message of an AP to be blocked and uses the created fake page to block connection between the AP and the station in a wireless network environment that uses a certain security technology. In the case of the fake message used in the wireless network environment that uses the certain security technology in particular, the wireless communication message (commonly referred to as a beacon) of the AP is reproduced and used with a modification to the channel switching request only. In this case, a default receiving address in the reproduced wireless communication message of the AP has a value for broadcasting, so the fake message is transmitted to all the stations that intend to connect to the AP for reproduction and the stations are all blocked (commonly referred to as AP blocking).

For example, when a BSSID of an unauthorized AP is detected, the AP blocking that blocks all the stations connected to the AP may also involve blocking of connection of a normal station connected to the unauthorized AP. In other words, in a case that the unauthorized AP is an AP used for public services, when AP blocking is performed on the authorized station for the unauthorized AP, it may also interrupt connection of a station normally connected to the unauthorized AP. Furthermore, in a case that the unauthorized station tries to connect to the authorized AP, when AP blocking is performed, a problem may arise that authorized stations normally connected to the authorized AP are all blocked as well.

Accordingly, the present disclosure may solve the problem that arises due to the AP blocking by transmitting the block message only to a station to be blocked, and may have the same effect as the AP blocking by transmitting block messages to the plurality of stations, respectively, which intend to connect to the unauthorized AP.

Figure 5:
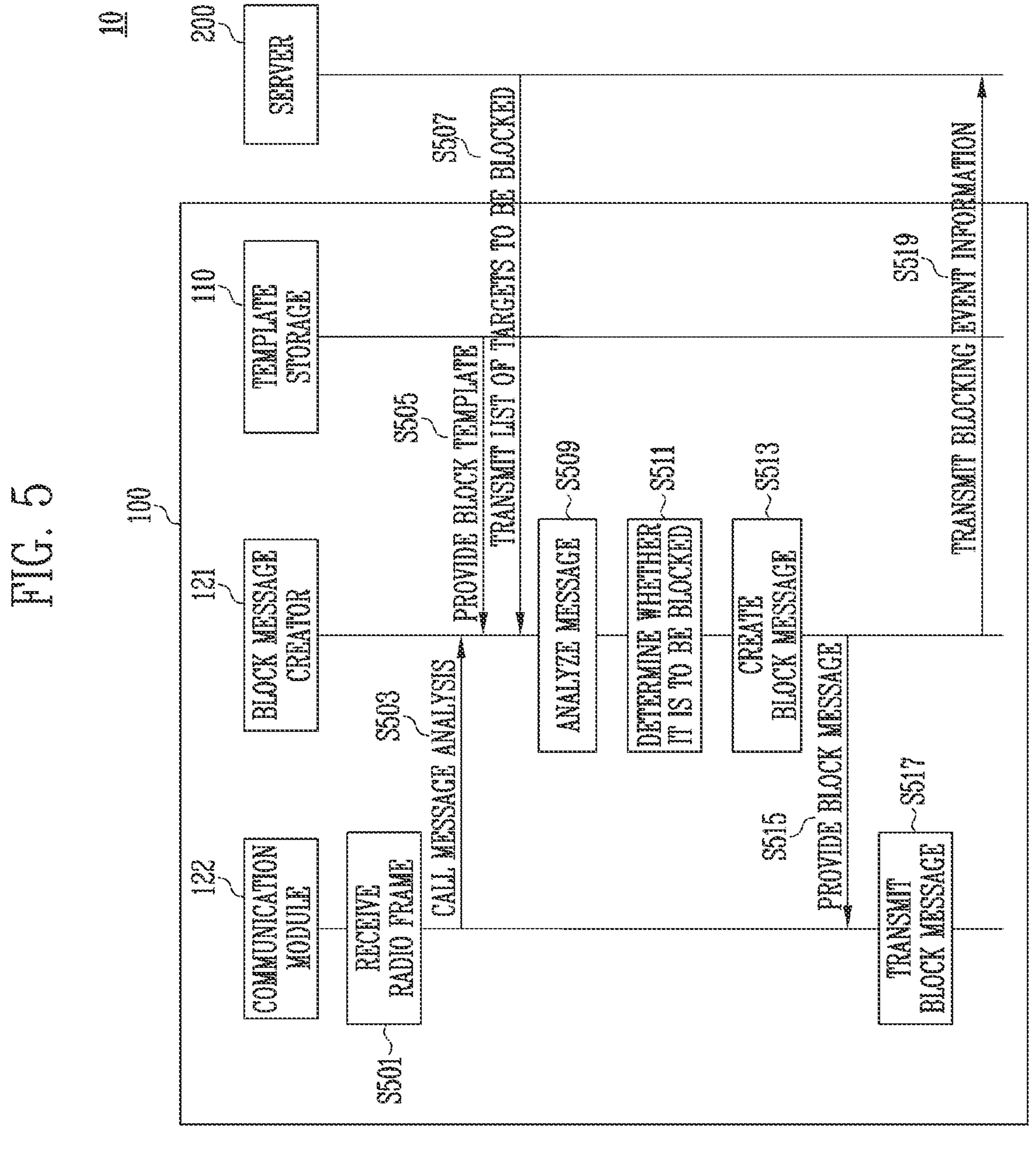
FIG. 5 is a diagram for explaining operation of a WIPS according to an embodiment of the present disclosure.

FIG. 5 is a diagram for explaining operation of a WIPS according to an embodiment of the present disclosure.

Referring to FIG. 5, the WIPS 10 may include the sensing device 100 and the server 200.

In an embodiment, the sensing device 100 may include a template storage 110, the block message creator 121 and the communication module 122.

At step S501, the communication module 122 may receive a radio frame. For example, the communication module 122 obtain messages transmitted or received by a station and an AP.

At step S503, the communication module 122 may call the block message creator 121 to analyze the message obtained in the communication procedure of the AP and the station.

At step S505, the template storage 110 may provide a block template to the block message creator 121. In an embodiment, the template storage 110 may provide the block message creator 121 with a block template used to create a wireless communication message for blocking connection between the station and the AP.

At step S507, the server 200 may provide a list of targets to be blocked to the block message creator 121. In an embodiment, the list of targets to be blocked may include a list of unauthorized APs, unauthorized stations, authorized APs and authorized stations.

At step S509, the block message creator 121 may analyze a message obtained by the communication module 122 in the communication procedure of the AP and the station, and add or update information of the station to transmit the message.

At step S511, the block message creator 121 may analyze the information included in the message obtained in the communication procedure of the AP and the station, and determine whether it is an AP or a station to be blocked by comparing with the list of targets to be blocked provided from the server 200.

At step S513, when the message of the station corresponds to a station included in the list of targets to be blocked, the block message creator 121 may create a block message with a BSSID of the AP to which the station intends to connect, MAC of the station, and a channel switching request command inserted to the block template.

At step S515, the block message creator 121 may provide the created block message to the communication module 122.

At step S517, the communication module 122 may transmit the block message to the station.

At step S519, the block message creator 121 may block connection between the station and the AP, and transmit blocking event information to the server 200.

Figure 6:
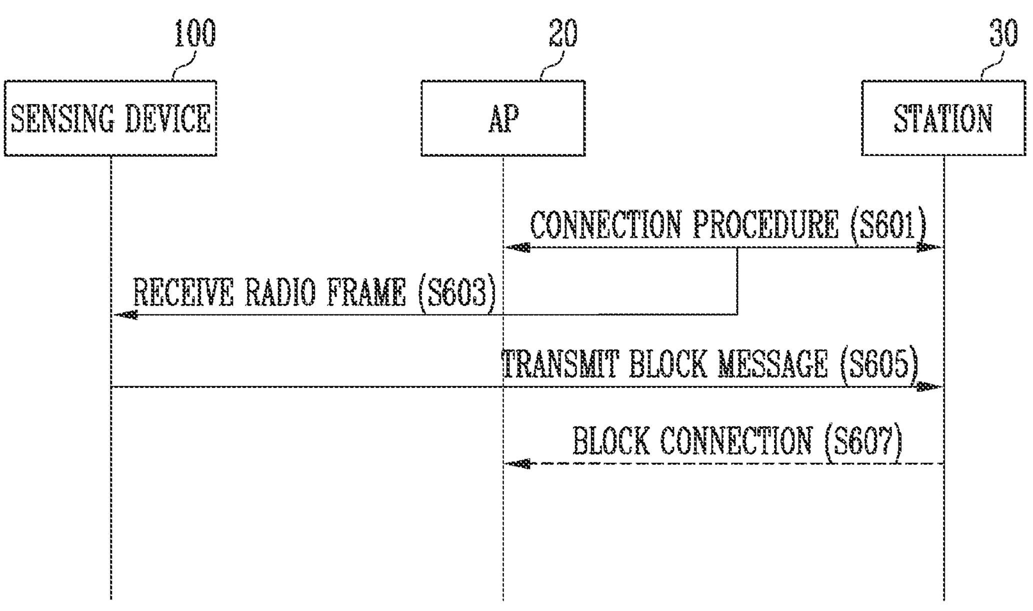
FIG. 6 is a diagram for explaining operation of a sensing device to block connection between a station and an AP according to an embodiment of the present disclosure.

FIG. 6 is a diagram for explaining operation of a sensing device to block connection between a station and an AP according to an embodiment of the present disclosure.

Referring to FIG. 6, step S601 may be a connection procedure of the station 30 and the AP 20. In an embodiment, the AP 20 may be an unauthorized AP, and the station 30 may be an authorized station. In another embodiment, the AP 20 may be an authorized AP, and the station 30 may be an unauthorized station.

At step S603, the sensing device 100 may receive a radio frame. For example, the sensing device 100 may obtain messages transmitted or received by the station 30 and the AP 20 in the connection procedure of the station 30 and the AP 20. The sensing device 100 may analyze information included in the message obtained in the communication procedure of the station 30 and the AP 20 and determine whether it corresponds to the list of targets to be blocked provided from the server 200.

At step S605, the sensing device 100 may analyze the information included in the message obtained in the communication procedure of the station 30 and the AP 20, and when a result of the analyzing reveals that the AP or the station corresponds to the list of targets to be blocked provided from the server 200, the sensing device 100 may create a block message with a BSSID of the AP 20, MAC of the station 30, a channel switching request command and other required information inserted to the block template and transmit the block message to the station 30.

At step S607, the station 30 may be blocked from being connected to the AP 20 as it tries to connect to the AP 20 through a channel value changed by receiving the block message.

Figure 7:
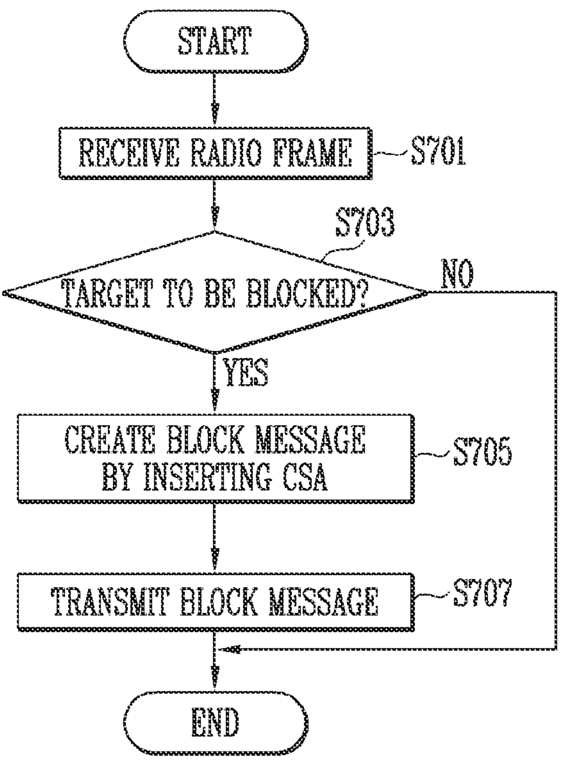
FIG. 7 is a flowchart for explaining a blocking procedure of an enhanced sensing device according to an embodiment of the present disclosure.

FIG. 7 is a flowchart for explaining a blocking procedure of an enhanced sensing device according to an embodiment of the present disclosure.

Referring to FIG. 7, at step S701, the sensing device 100 may receive a radio frame. For example, the sensing device 100 may obtain messages transmitted or received in a communication procedure of a station and an AP.

At step S703, the sensing device 100 may determine whether it is a target to be blocked by analyzing the message obtained in the communication procedure of the station and the AP. In an embodiment, the sensing device 100 may determine whether the message obtained in the communication procedure of the station and the AP corresponds to a list of targets to be blocked provided from the server 200. The sensing device 100 proceeds to step S705 when the AP or the station corresponds to the list of targets to be blocked as a result of analyzing information included in the message obtained in the communication procedure of the station and the AP. Otherwise, the sensing device 100 terminates the procedure when the AP or the station does not correspond to the list of targets to be blocked as a result of analyzing information included in the message obtained in the communication procedure of the station and the AP.

At step S705, the sensing device 100 may create a block message with a BSSID of an AP to which the station intends to connect, MAC of the station, a channel switching request command (CSA) and other required information inserted to a block template, when the AP or the station is on the list of targets to be blocked as a result of analyzing the information included in the message obtained in the communication procedure of the station and the AP.

At step S707, the sensing device 100 may transmit the created block message to the station.

The sensing device 100 shown in FIG. 7 may reduce time required to determine whether the connection between the station and the AP corresponds to 802.11w by equally creating the block message no matter whether the connection is 802.11w as compared to the blocking procedure of the conventional sensing device as shown in FIG. 3. Furthermore, time to reproduce the wireless communication message of the AP may be reduced by storing the block template comprised of items only used to block connection between the station and the AP instead of reproducing all the wireless communication messages of the AP. Moreover, as the sensing device 100 creates a channel value to be changed, which is included in the channel switching request command, to be a random channel value other than a channel value included in the wireless communication message transmitted by the AP, the sensing device 100 may reduce time to determine a frequency band of the wireless communication message transmitted by the AP and time to create a different channel switching request command for each frequency band as compared to the conventional sensing device.

The invention claimed is:

1. A sensing device for monitoring connection between an access point and a plurality of stations, the sensing device comprising:

a template memory of a wireless intrusion prevention system (WIPS) for the access point, configured to store a block template which is used to create a wireless communication message by the WIPS to block connection between a target station among the plurality of stations and the access point; and a sensing transceiver configured to obtain a message transmitted or received by the target station and the access point, configured to receive the block template from the template memory to be revised by inserting information, and as a result of analyzing the message, when the target station is a station included in a list of targets to be blocked provided from a server, transmit to the target station, a block message (fake beacon) with an address of the access point, an address of the target station, and a channel switching request command to request switching of a channel on which the target station and the access point communicate inserted to the block template, without having to determine whether the message transmitted by the target station corresponds to a 802.11w connection, whether a frequency band of a reproduced wireless communication message of the access point is 2.4 GHZ, and without having to create a different channel switching request command for each frequency band.

2. The sensing device according to claim 1, wherein the channel switching request command comprises a channel value to be changed, and the channel value to be changed is a channel value different from a channel value used by the access point.

3. The sensing device according to claim 2, wherein the channel value to be changed is a channel value created randomly.

4. An operating method of a sensing device for monitoring connection between an access point and a plurality of stations, the operating method comprising:

storing a block template in a wireless intrusion prevention system (WIPS) for the access point, which is used to create a wireless communication message by the WIPS to block connection between a target station among the plurality of stations and the access point;

receiving the block template to be revised by inserting information;

obtaining a message transmitted by the target station to the access point, and determining based on the message whether the target station is a station included in a list of targets to be blocked provided from a server; and transmitting, to the target station, a block message (fake beacon) with an address of the access point and a channel switching request command to request switching of a channel on which the target station and the access point communicate inserted to the block template, without having to determine whether the message transmitted by the target station corresponds to a 802.11w connection, whether a frequency band of a reproduced wireless communication message of the access point is 2.4 GHZ, and without having to create a different channel switching request command for each frequency band.

5. The operating method according to claim 4, wherein the channel switching request command comprises a channel value to be changed, and the channel value to be changed is a channel value different from a channel value used by the access point.

6. The operating method according to claim 5, wherein the channel value to be changed is a channel value created randomly.

7. A sensing device for monitoring connection between an access point and a plurality of stations, the sensing device comprising:

a template memory of a wireless intrusion prevention system (WIPS) for the access point, configured to store a block template which is used to create a wireless communication message by the WIPS to block connection between the plurality of stations and the access point; and a sensing transceiver configured to obtain a message transmitted or received by the plurality of stations and the access point, configured to receive the block template from the template memory to be revised by inserting information, and as a result of analyzing the message, when the access point is an access point included in a list of targets to be blocked provided from a server, transmit, to the plurality of stations, block messages (fake beacons) with an address of the access point, an address of each of the plurality of stations and a channel switching request command to request switching a channel on which the plurality of stations and the access point communicate inserted to the block template, without having to determine whether the message transmitted or received by the plurality of stations and the access point corresponds to a 802.11w connection, whether a frequency band of a reproduced wireless communication message of the access point is 2.4 GHZ, and without having to create a different channel switching request command for each frequency band.

8. The sensing device according to claim 7, wherein the channel switching request command comprises a channel value to be changed, and the channel value to be changed is a channel value different from a channel value used by the access point.

9. The sensing device according to claim 8, wherein the channel value to be changed is a channel value created randomly.

* * * * *